March 26, 1957
A. J. PERKINS
2,786,486
TUBING SECTION REMOVER
Filed Oct. 10, 1955
2 Sheets-Sheet 1
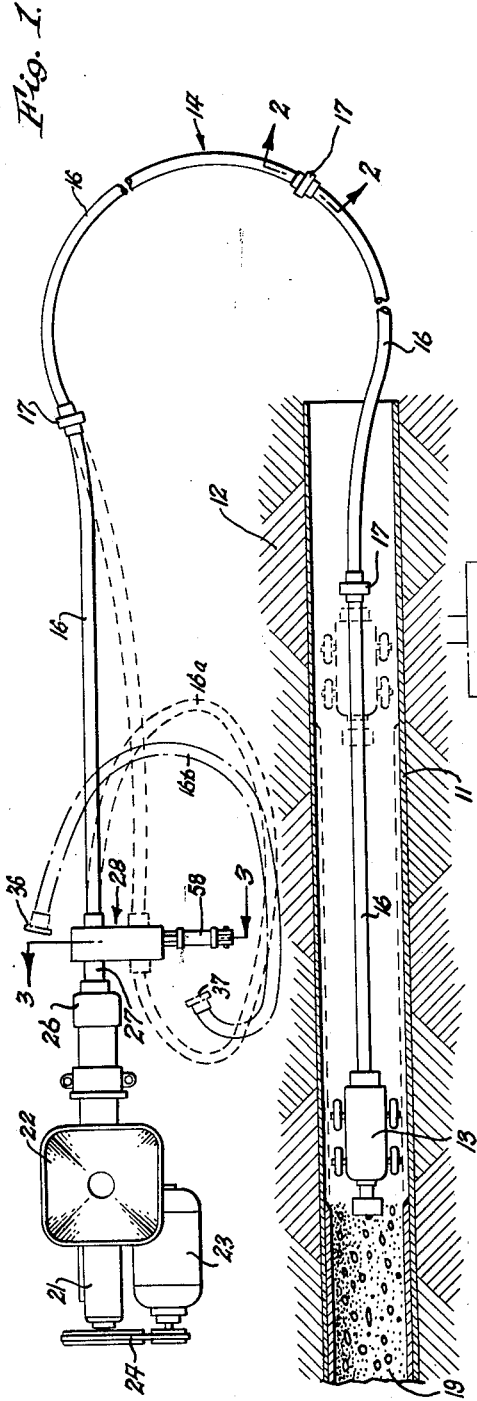
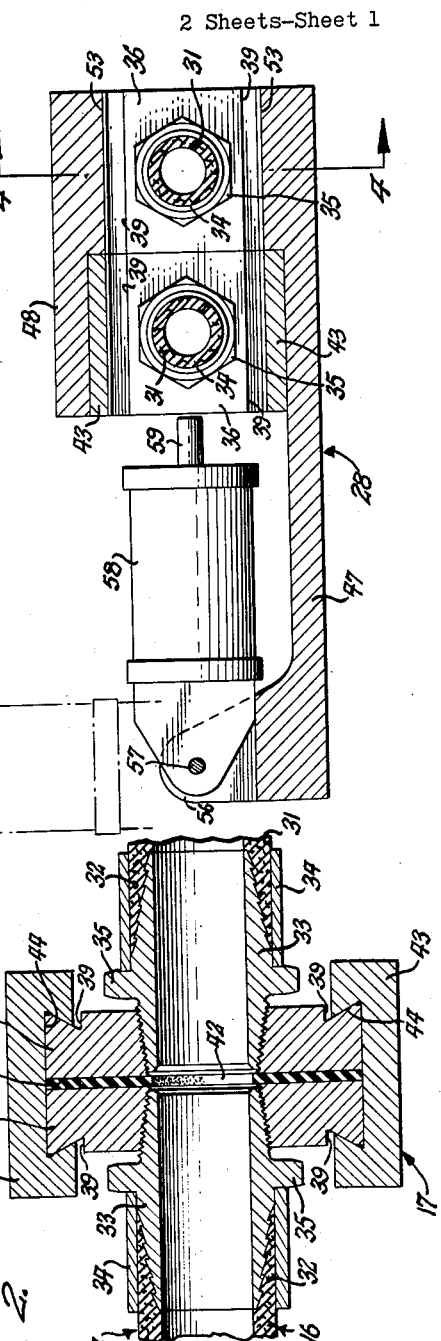
INVENTOR.
Alfred J. Perkins
BY
Popp and Sommer
ATTORNEYS.

United States Patent Office 2,786,486
Patented Mar. 26, 1957

2,786,486

TUBING SECTION REMOVER

Alfred J. Perkins, Warsaw, N. Y., assignor to Perkins Pipe Linings, Inc., Grand Island, N. Y., a corporation of New York Application October 10, 1955, Serial No. 539,460

6 Claims. (Cl. 137—561)

This invention relates to flexible tubing lines. It is specifically concerned with devices by means of which sections of tubing can be quickly and easily removed from a line with only an instantaneous interruption of flow therein. The invention is also concerned with hose or tubing couplings which are particularly adapted for use with such devices.

Long lines of flexible tubing or hose are frequently used for conveying fluids from one location to another. Such lines are usually formed from a plurality of sections of hose or tubing, the sections being joined at their ends. In many cases, it is desirable to shorten such lines without materially interfering with the flow of the fluid therethrough. This is particularly important where the lines are used to conduct cement mortar where, without such shortening, the wear on the pump for the cement mortar would be completely prohibited. The present invention provides means by which this shortening can be accomplished.

It is an object of the present invention to provide a novel coupling for joining sections of tubing or hose.

Another object of the invention is to provide a device by which sections of tubing or hose having such novel couplings may be easily and rapidly removed from a line without materially interrupting fluid flow therethrough.

Still another object of the invention is to provide devices of the character described which are simple and inexpensive while at the same time rugged and durable.

Other objects and advantages of the invention will be apparent from the following description and drawings in which:

Fig. 1 is a general, somewhat conventionalized, view of pipe lining apparatus employing the devices of the present invention.

Fig. 2 is an enlarged, detail sectional view, taken on line 2—2 of Fig. 1, of one of the novel hose or tubing couplings employed.

Fig. 3 is an enlarged, transverse sectional view, taken on the line 3—3 of Fig. 1, of the novel tubing section remover of the present invention.

Figure 4:
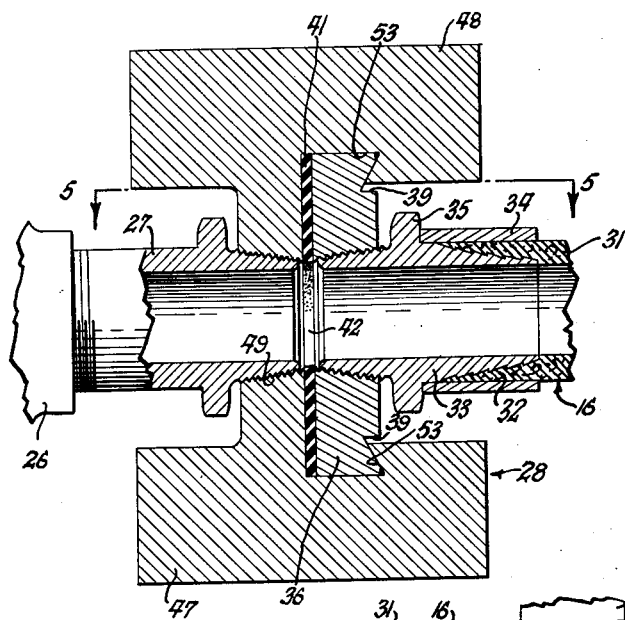
Fig. 4 is a sectional view taken on the line 4—4 of Fig. 3.

In Fig. 1 of the accompanying drawings, the novel devices of the present invention are shown as a part of a system for lining underground conduits in situ for the purpose of reconditioning and extending the life thereof. Conduits for carrying water are frequently lined with cement mortar. The lining, in the use of the present invention, is applied to the interior of the pipes after they have been laid and to recondition the same. Since such laid pipe lines are often quite long, specialized equipment has been devised for forming the cement mortar linings. Referring to Fig. 1, the reference numeral 11 indicates a portion of a pipe line which is buried in the ground 12. Within the pipe is a lining machine 13 which may be of any preferred construction. A machine of this type is shown in my copending application, Serial No. 502,441, which does not employ a hopper or reservoir at the machine.

Fluid cement mortar is supplied to the lining machine 13 by a line 14 formed of flexible tubing or hose sections 16, joined together by couplings 17, and is ejected therefrom through impelling mechanism to form the pipe lining 19. A pump 21, preferably of a type resistant to abrasion, is used to force the cement mortar from a loading hopper 22, through the tubing line 14. The pump may be driven by suitable means such as a motor 23 connected to the pump by a power belt 24. Interposed between the line 14 and the pump outlet 26, and rigidly attached to the latter by a nipple 27 is the novel tubing section remover of the present invention, generally designated 28.

Each section 16 of the line 14 comprises a length of flexible hose or tubing 31, preferably of reinforced rubber or similar material. Each of the ends 32 of the hose 31 is internally bevelled and is clamped to one tapered end of a metal nipple 33 by a clamping ring 34. As shown in Figs. 2 and 4, the outer surface of the nipple end may be serrated. The other ends of the nipples 33 are respectively shown as threadedly engaged in orifices provided in coupling plates 36, 37, although any other form of attachment could be employed. Polygonal wrenching portions 35 are provided on the nipples 33.

The coupling plates 36, 37 are identical in shape and construction, the different reference numerals being employed merely for identification of the respective ends of the tubing sections. Each plate is formed of suitable wear-resistant metal and is preferably shaped as a rectangular block having a threaded orifice or aperture for reception of a nipple 33 extending therethrough at the centers of the larger faces. The outer face of each coupling plate is provided, adjacent its upper and lower edges (Fig. 2), with transverse, straight grooves 39, the outer walls of which extend diagonally to the respective proximate edges of the block. A sealing member or gasket 41 covers the inner, planar face of the coupling plate 36 and is bonded thereto by suitable means such as cement. A hole or orifice 42 registering with the openings through the plate and the nipple 33 is provided in the gasket 41.

To couple two lengths of hose 31, the coupling plates 36 and 37, respectively, of the two sections are placed in face to face relationship with a gasket 41 therebetween as shown in Fig. 2. The corresponding grooves 39 along the outer edges of the plates 36 and 37 present outwardly diverging faces which cooperate with grooves 44, preferably of dovetail form, in a pair of clamping slides 43. The latter are applied to the juxtaposed coupling plates 36 and 37 by sliding the edges of the coupling plates into the grooves 44 of the clamping slides. When so engaged, the two sections of line are held firmly together with a fluid-tight connection. For convenience in assembly, each of the grooves 44 may be slightly flared at one end.

In the application of a cement mortar lining to the interior of a pipe line, it is preferred to operate on a long length of pipe at one time. Consequently, access to the interior of the pipe line is provided at points widely spaced from one another, the distance between openings often being as much as 1000 feet or more. In carrying out the lining operation, the lining machine 13 is inserted into the pipe line 11 through an opening and propelled by suitable mechanism provided to the far end of the section of the line which is to be coated. The machine 13 is then moved slowly backward while cement mortar pumped to the machine through the line 14 formed of flexible tubing sections 16, is applied to the inside of the pipe by rotary impelling mechanism carried by the machine. Suitable mechanism of known type may also be employed, if desired, to provide a smoother surface on the concrete lining. The cement mortar coating is continuous within the pipe line since the lining machine is moved at a constant rate toward its point of entrance.

It will be obvious that very large amounts of power are required to force a viscous fluid such as cement mortar through 1000 feet or more of tubing. Also, the consequent wear on the pump would render continued use of the assumed 1000 feet of tubing for the whole long operation entirely impracticable. Consequently, it is desirable to keep the length of tubing in use as short as possible and this can be done by removing sections of the tubing, sections normally being about 50 feet in length, as the lining machine moves back. Heretofore, however, it has been impossible to remove these sections satisfactorily since flow of the cement mortar through the line would be interrupted for at least several seconds while a tubing section was removed and the next section connected to the pump. Such an interruption of cement mortar flow would result in a break in the continuity of the lining in the pipe 11 if the lining machine continued to move. Even if the lining machine were stopped during the removal of the tubing section, an irregular deposit of cement mortar would be formed in the pipe line. Both of these occurrences are undesirable. The present invention makes it possible to remove a tubing section from the line 14 feeding the cement mortar to the lining machine 13 without interruption of the flow of cement mortar for more than a fraction of a second. It is, therefore, possible to produce linings in which irregularities are reduced to a minimum.

The novel tubing section removing mechanism devised by applicant for this purpose is shown in connection with a pipe lining system in Fig. 1 and is generally designated 28. As more clearly seen in Figs. 3 to 6, the mechanism which is preferably made of steel, comprises a base 47 having an upwardly projecting housing portion 48 at one end thereof. Adjacent the outer end of the housing portion 48 there is provided on one side thereof a fluid inlet comprising an orifice 49 into which the nipple 27 joining the removing mechanism with the pump outlet 26 is threadedly engaged. At its other end, the housing 48 is provided with a recess 51 of such size and shape as to slidably receive one of the couplings 17. Extending from the recess 51 through the outer end of the housing 48 above and below the orifice 49 are grooves 53 adapted to slidably receive a coupling plate 36 and its associated gasket 41. The grooves are each provided with one bevelled side for cooperation with the top and bottom bevelled portions of the plate 36. The recess 51 is also open at its sides to provide clearance for the nipples 33 attached to the coupling plates 36, 37.

At the other end of the tubing section removing device 28, a pair of laterally spaced lugs 56 project upwardly from the base 47. Pivotally supported between the lugs 56 on a pivot pin 57 is a fluid actuated ram 58, the piston (not shown) of which is provided with a plunger 59 that projects outwardly in alinement with the coupling plate 36 of a coupling 17 removably held in the recess 51.

Figure 5:
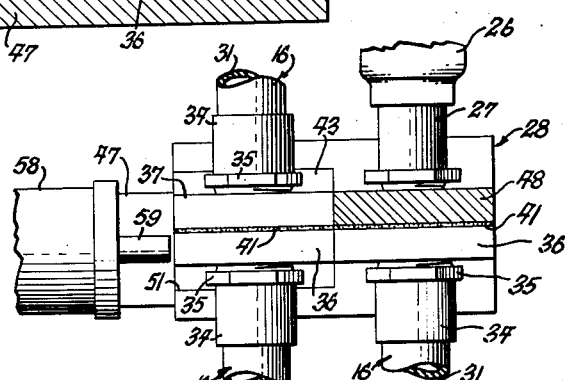
Fig. 5 is a somewhat reduced sectional view taken approximately on the line 5—5 of Fig. 4 showing the section arranged for cutting out a section of line.

During normal operation of the system, as shown in solid lines in Fig. 1 and in Figs. 3 and 5, the nipple 27 connecting the pump outlet with the tubing section removing device 28 is alined with the nipple 33 secured in the coupling plate 36 of the end section of the tubing or hose line 14 that extends to the lining machine 13. Communication through the nipples 27 and 33 permits flow of cement mortar to take place. When, in applying the cement mortar facing to the inner surface of the pipe line 11, the machine 13 has moved toward the open end of the pipe sufficiently to make removal of a tubing section desirable, this may be accomplished rapidly and easily. It is merely necessary to form a loop in the tubing section 16 which is attached to the tubing section removing device 28 so that the coupling 17 at the other, far, end of the section may be placed in the recess 51 of the housing 48. While so placing the coupling 17, the ram 58 is swung upwardly, out of the way, on the pin 57 to the position shown in broken lines in Fig. 3.

Figure 6:
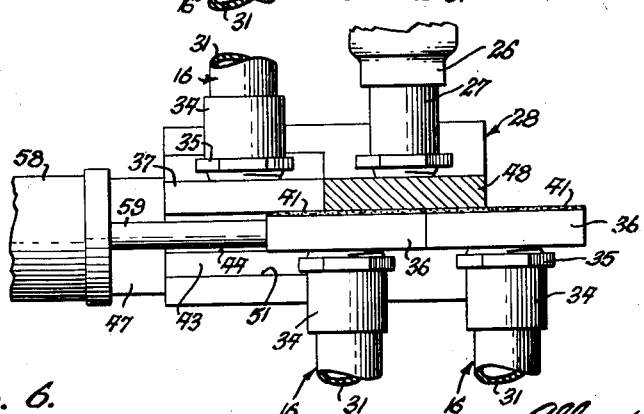
Fig. 6 is a sectional view similar to Fig. 5 showing the positions of the parts as a tubing section is cut out of the line.

As shown in Figs. 3 and 5, the coupling 17 is thus placed beside the coupling plate 36 which is already present in the tubing section removing device 28 with the two plates 36 in alinement, side by side. At this stage, cement mortar still flows through the device as before. The ram 58 is then returned to the position shown in solid lines in Fig. 3 and the piston thereof is actuated to cause outward movement of the plunger 59. This is alined with the coupling plates 36 and, as shown in Fig. 6, moves the plate 36 through which cement mortar has been passing out of the housing grooves 53 while the plate 36 of the coupling 17 is simultaneously moved into register with the nipple 27.

This action takes place almost instantaneously, no more than a fraction of a second being required to divert the flow from the tubing section previously connected to the tubing section removing device to the next section. The coupling plate 37 with the clamping slides 43 may then be removed from the housing 48 and the tubing section, being now free at both ends, may be emptied of cement mortar and cleaned. The action described above may be repeated as additional lengths of tubing are withdrawn from the pipe 11 during the outward travel of the lining machine 13.

In Fig. 1, the dashed lines indicate how the apparatus appeared before the tubing section indicated by the numeral 16a was removed. It will be noted that the line 14 is looped so that the coupling 17 may be placed in the switching device in the correct position. The tubing section 16b, shown in dot-dash lines, represents the section 16a after the shift of the coupling plate 36 of the joint 17 to the position shown in solid lines.

When used with equipment for lining pipe lines with cement mortar, the tubing section removing device of the present invention is of great importance since it permits shortening of the cement mortar filled line without interrupting flow of the cement mortar. Not only does this reduce the power necessary to force cement mortar through the line thereby progressively reducing wear on the cement mortar pump rendering the use of such a pump practicable, but since the tubing sections can be emptied of cement mortar and washed out as they are disconnected, there is no likelihood of the cement mortar setting in part of the tubing or hose as might happen if the operation were stopped with the whole line 14 full of cement mortar. Moreover, it is unnecessary to provide drums or other means for storing the whole length of cement mortar filled tubing above ground. This also saves expense and makes pipe lining operations less costly.

While the novel tubing section removing device of the present invention has been specifically described as applied to cement mortar lining of pipe lines in situ, it is to be understood that its usefulness is not limited to that application. Indeed, it may be used to advantage in many other systems where the removal of a tubing section without substantial flow interruption is desired because of the rapidity with which the shift can be made. It is also to be understood that the novel hose or tubing coupling herein described and claimed may be used without the tubing section remover of the present invention whenever a quickly made or broken coupling is desired.

In the foregoing specification and drawings specific embodiments of the tubing section coupling and removing device of the present invention have been described and shown. Obviously, however, the illustrated structures can be extensively modified without departing from the principles and spirit of the invention. For example, mechanical means may be used for shifting the plates 36 instead of a fluid actuated ram. Further, for example, the shape of the plates 36, 37 may be other than rectangular. It is desirable, however, for the shape to be such that the ends of the plates 36 which are in contact in the tubing section remover 28 are complementary in shape, thus preventing leakage when shifting plates. Many other possible changes and variations will be apparent upon study of the invention. It is, therefore, intended that the invention shall not be construed as limited to the construction illustrated and described but, rather, should be construed as broadly as permitted by the appended claims.

I claim:

1. A device of the character described comprising a housing having a portion adapted to receive a coupling between two lengths of tubing, an inlet for said housing spaced from said coupling receiving portion, means for holding one element of a second tubing coupling in communication with said inlet, and means within said housing whereby an element of the coupling held therein may be moved into communication with said inlet while simultaneously displacing said first-mentioned element.

2. A device of the character described which comprises a housing, an inlet for said housing adapted for connection to a source of fluid, means for removably holding one element of a tubing coupling in fluid-tight engagement around said inlet whereby to permit flow therethrough, means for removably supporting a second tubing coupling adjacent said first-mentioned means, and means for moving one element of said second coupling into substantially fluid-tight engagement around said inlet while simultaneously displacing said first-mentioned coupling element.

3. A device of the character described comprising a housing, an inlet for said housing adapted to be connected to a source of fluid, a recess in said housing longitudinally spaced from said inlet and adapted to removably hold a tubing coupling comprising a pair of apertured coupling plates, and grooves in said housing adjacent said inlet and communicating with said recess whereby a coupling plate of said coupling may be moved from said recess into registry with said inlet.

4. A device of the character described which comprises a base having a housing thereon, said housing having a recess adapted to receive a tubing coupling comprising a pair of apertured coupling plates, an inlet for said housing longitudinally spaced from said recess, and grooves in said housing communicating with said recess and adapted to slidably receive one of said coupling plates from said recess and hold said plate with its aperture in registry with said inlet.

5. A device of the character described which comprises a base having a housing thereon, an inlet for said housing adapted to be connected to a source of fluid, a recess in said housing longitudinally spaced from said inlet, said recess being adapted to receive a tubing coupling comprising a pair of apertured coupling plates, and grooves in said housing adjacent said inlet, said grooves communicating with said recess and being adapted to slidably receive one of said coupling plates from said recess and to retain said plate with its aperture in registry with said inlet.

6. A device of the character described which comprises a base having a housing thereon, an inlet for said housing adapted to be connected to a source of fluid, a recess in said housing longitudinally spaced from said inlet, said recess being adapted to slidably receive a tubing coupling comprising a pair of apertured coupling plates, grooves in said housing above and below said inlet, said grooves communicating with said recess and being adapted to slidably receive one of said coupling plates from said recess, and means carried by said base adapted to move one of said coupling plates from said recess into said grooves whereby the aperture of said plate may be placed in registry with said inlet.

References Cited in the file of this patent

UNITED STATES PATENTS

| | | |
|---|---|---|
| 2,057,771 | Elkins | Oct. 20, 1936 |
| 2,265,268 | Culligan | Dec. 9, 1941 |
| 2,330,447 | Posey | Sept. 28, 1943 |
| 2,754,845 | Phillips | July 17, 1956 |